Figure 1:
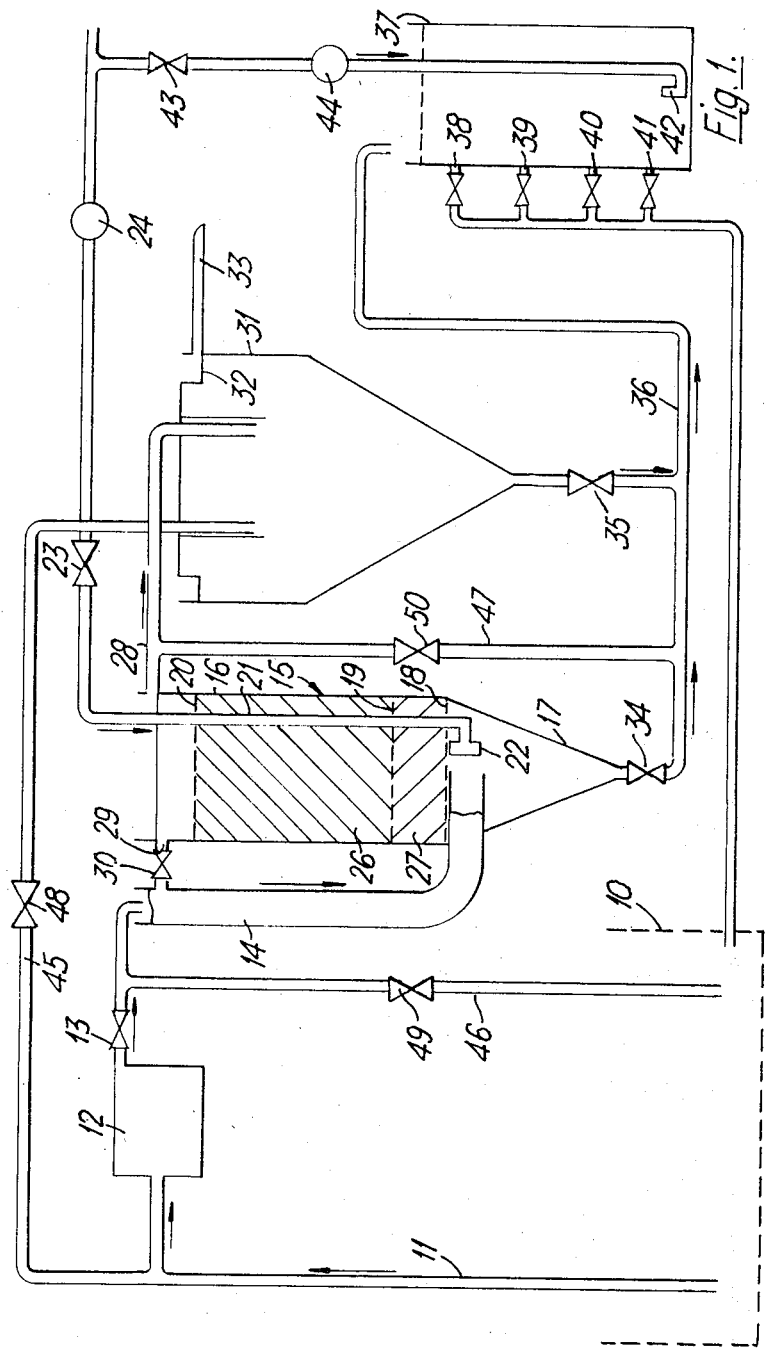

United States Patent [19]
Hopwood

[11] 3,773,660
[45] Nov. 20, 1973

[54] METHOD AND APPARATUS FOR TREATING EFFLUENT

[75] Inventor: Adrian Patrick Hopwood, Chelmsford, England

[73] Assignee: Mono Pumps (Engineering) Limited, Clerkenwell Green, London, England

[22] Filed: Oct. 5, 1971

[21] Appl. No.: 186,780

[30] Foreign Application Priority Data
Oct. 13, 1970 Great Britain.................. 48,665/70

[52] U.S. Cl........................ 210/8, 210/17, 210/151, 210/195, 210/196, 210/283
[51] Int. Cl............................................... C02c 1/04
[58] Field of Search.................................. 210/3–9, 210/14, 15, 17, 150, 151, 194–197, 283

[56] References Cited
UNITED STATES PATENTS

| | | |
|---|---|---|
| 3,232,434 | 2/1966 | Albersmeyer..................... 210/17 X |
| 1,991,896 | 2/1935 | Hays................................... 210/17 |
| 3,546,111 | 12/1970 | Busch................................. 210/17 |
| 3,293,174 | 12/1966 | Robjohns........................... 210/17 |
| 2,200,580 | 5/1940 | Pruss et al. ........................ 210/17 |
| 3,623,978 | 11/1971 | Boze et al. ..................... 210/283 X |
| 2,071,591 | 2/1937 | Tholin................................ 210/17 |
| 3,402,125 | 9/1968 | Tanaka........................... 210/17 X |
| 3,468,795 | 9/1969 | Bye-Jorgensen.................. 210/17 X |
| 3,563,888 | 2/1971 | Klock............................. 210/150 X |

Primary Examiner—Michael Rogers
Attorney—Martin Fleit

[57] ABSTRACT

A method of and apparatus for treating raw effluent such as sewage by passing the effluent through a vessel containing submerged media and passing air through the effluent and media. The effluent and air are preferably passed upwards through the vessel. The media are suitably short lengths of plastics tubing. A two stage process is possible, the effluent being passed through two such vessels. Settlement tanks for the so treated effluent are provided.

17 Claims, 2 Drawing Figures

METHOD AND APPARATUS FOR TREATING EFFLUENT

The present invention relates to a method and apparatus for treating effluent. Although it is not exclusively directed to this particular field of application, it is primarily intended for the treatment of sewage.

Various proposals have been made for the treatment of sewage and it is now proposed to provide a system which is extremely compact and efficient in operation.

According to the present invention there is provided a method of treating raw effluent including the steps of macerating the effluent, passing it to a vessel containing submerged contact media and passing air through the effluent and media.

Preferably, the air is fed upwardly through the vessel and in a preferred arrangement the effluent is also fed to the vessel at the lower region thereof. Biologically purified effluent can leave the top of the vessel and pass to a suitable settlement tank and the sludge from the vessel and the settlement tank can be fed to a suitable sludge treatment vessel. The effluent from the settlement tank can, if desired, be passed to at least one more stage wherein the above steps, with the exception of maceration, are repeated. The effluent can, alternatively, be passed from the first vessel to a second vessel and then to a settlement tank.

The invention also provides raw effluent treatment apparatus including a macerator, at least one vessel containing contact media, means for supplying air to the vessel, and means to withdraw treated effluent from the vessel at a location in the vessel above the media such that the media is submerged.

The apparatus may include a settlement tank to which treated effluent is fed from the at least one vessel.

In an alternative construction, there are two vessels containing contact media and effluent is fed from the first vessel or settlement tank to a second vessel, and including a further settlement tank to which effluent is fed from the second vessel.

Preferably, the macerator is a combined macerator and pump as described in British Pat. No. 970,667.

In a convenient construction, the contact media is in the form of a plastics media such as a number of short lengths of plastics tubing mounted in a cylindrical portion of the vessel between upper and lower grids. If two vessels are provided, it is preferable for the vessel through which effluent passes second to contain smaller media than the first vessel. The grids permit the throughflow of effluent and air but prevent the plastics tubing from falling downwardly. In a preferred construction both the air and the effluent are fed to the vessel close to one another below the lower grid so that the effluent and air both flow upwardly. A suitable bypass conduit may be provided at the top of the vessel so that the effluent may be recirculated if desired.

In a suitable construction the air is fed in through a diffuser such as that sold under the Trade name "Dravo" which essentially comprises a box closed by a reed which is caused to vibrate by the through flow of air, and which will close the box when the supply of air is cut off.

Figure 2:
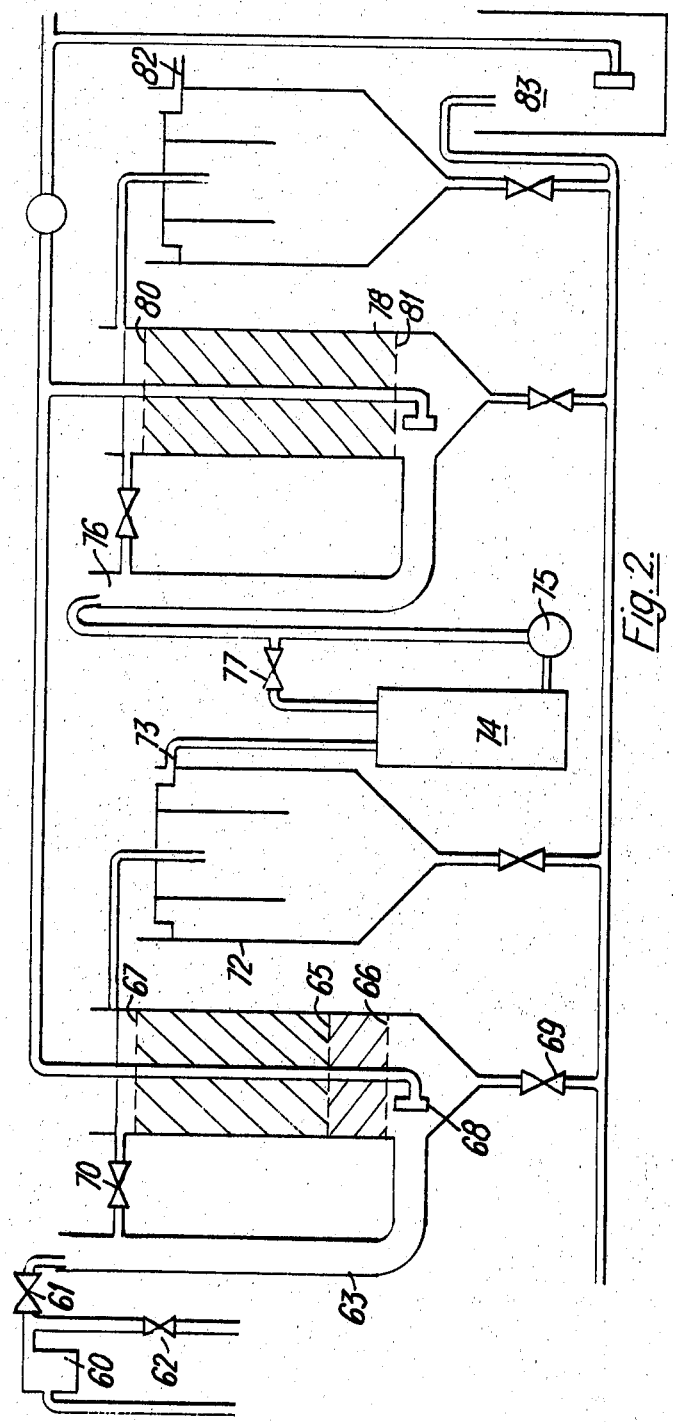

In order that the invention may more readily be understood, the following description is given, merely by way of example, reference being made to the accompanying drawings, in which:

FIG. 1 is a schematic side elevation of one embodiment of apparatus according to the invention, and FIG. 2 is a schematic side elevation of another embodiment of apparatus according to the invention.

Referring to FIG. 1, there is illustrated therein a sump 10 which forms the supply of sewage effluent to be treated. An upwardly extending pipe 11 serves to feed material to a pump macerator assembly 12 which is preferably of the type described in British Pat. No. 970,667. The outlet of the pump macerator is connected via a valve 13 to the inlet of a large bore tube 14 which extends downwardly and then horizontally to near the axis of a vessel 15, which includes an upper substantially cylindrical portion 16 and a lower conical hopper portion 17.

Three wide mesh plastic-coated grids 18, 19 and 20 extend substantially horizontally across the cylindrical portion of the vessel.

Extending downwardly through the vessel is an air supply pipe 21 terminating, at its lower end, in a diffuser 22 which essentially comprises a box, of plastics material, provided with a cover formed of stainless steel. Thus, when air is supplied through the pipe 21 the cover acts as a reed, and vibrates to distribute the air through the vessel 20. Should the air supply be cut off, for example, through closure of valve 23, then the reed or cover will close and prevent the diffuser from becoming fouled. Such a diffuser is sold under the Trade name "Dravo".

The supply pipe 21 is also provided with a fluid flow meter of the float-equipped fluid column type, such as that sold under the Trade name "Rotameter".

Within the cylindrical portion 16, and between the grids 19 and 20 the vessel 15 is packed with contact media comprising, for example, two inch lengths of 2" diameter plastics material tubes 26. Similarly, below the grid 19 and above the grid 18 the vessel is packed with a further plastics media in the form of 3 to 4" diameter plastics tubing media 27.

At its top, on the right as illustrated in the drawing, an overflow tube 28 positioned above the level of the grid 20 provides a passage for the outflow of treated effluent. On the opposite side, a further outlet tube 29, below the overflow tube 28, provided with a valve 30, connects the top of the vessel 15 to the conduit 14, for recycling if so desired.

A settlement tank 31 for the treated effluent is supplied via the pipe 28. The clarified effluent leaves the settlement tank via a launder 32 and an outflow pipe 33.

The vessel 15 and the settlement tank 31 are both connected via the valves 34 and 35 and tube 36 to a sludge tank 37. This tank is provided with four draw off points 38, 39, 40 and 41 each provided with a control valve, so that supernatant at different levels may be drawn off and returned to the sump 10.

The sludge tank 37 may be aerated via a diffuser 42 similar to the diffuser 22 in vessel 15, air being fed from the same source via a valve 43 and a gauge 44 of similar type to gauge 24. If desired, various recycle pipes 45, 46 and 47 having valves 48, 49 and 50 respectively, may be provided between the inlet to the pump macerator 12 and the settlement tank 31, between the outlet of the pump 12 and the sump 10, and between the pipes 28 and 36 respectively.

In operation, raw sewage is drawn up via pipe 11 to pump macerator 12. Any unwanted solid materials which would tend to damage the pump macerator fall under gravity back into the sump 10 and after a suitable build up can be removed. General operation of this arrangement is described in U.S. Pat. No. 970,667. The effluent is then pumped via conduit 14 to the bottom of the cylindrical portion of the vessel 15 and flows upwardly through the media 27 and 26. The treated effluent flows out via pipe 28 into the settlement tank 31 from which it is drawn off via launder 32 and outlet pipe 33. At the same time air fed via pipe 21 also flows up through the media 27 and 26 and through the effluent thereon, and causes aerobic fermentation to occur.

Some solids can be removed from the vessel 15 thus decreasing the load on the settling tank 31. Thus the bottom portion 17 of the vessel 15 may be considered to act as a primary sedimentation tank.

The sludge removed from the bottom of the vessel 15 and settlement tank 31 is fed back to the sludge digester 37 where it is digested by means of air flowing through the diffuser 42.

FIG. 2 of the accompanying drawings illustrates another form of apparatus according to the invention, and which includes two vessels containing contact media and two settlement tanks.

A pump macerator 60, similar in construction and operation to that shown in FIG. 1, has its outlet connected via a valve 61 to a large bore tube 63 extending downwardly and then horizontally into a first vessel 64. The macerator inlet is connected to a supply of effluent to be treated (not shown), and there is a return line including a valve 62 to the supply. The vessel 64 is the same as vessel 15 of FIG. 1, having three media retaining grids 65, 66, 67 an air inlet line leading to a diffuser 68, and an outlet valve 69 at its lower end. A return line and valve 70 for recirculating effluent are provided. An outlet 71 from vessel 64 leads to a first settlement tank 72, similar to tank 31 of FIG. 1, while an upper outlet 73 from this tank leads to a holding vessel 74. A pump 75 is provided adjacent an outlet from the holding vessel, to pass effluent to the top of a large bore tube 76. A return line and valve 77 to the holding vessel are provided. A second media containing vessel 78 and settlement tank 79 are supplied by the tube 76 and these are the same as vessel 64 and tank 72, except that it is preferred to provide media of one size only in vessel 64, between grids 80 and 81. Suitably the media in this vessel are short lengths of one inch diameter plastic tubing, while the media in vessel 64 are as the media in vessel 15 of FIG. 1. An outlet 82 leads from the second settlement tank 79. A sludge tank 83 is shown, which is suitably similar to that of FIG. 1.

The operation of the apparatus of FIG. 2 is the same as that of FIG. 1, except that the treated effluent leaving the first settlement tank 72 is passed to a holding tank 74 and then supplied as desired to the second vessel 78 and tank 79 for further treatment. The holding tank may be dispensed with if the throughputs of the two pairs of vessels and tanks are matched.

The second treatment step provided by the second vessel 78 and tank 79 improves the quality of effluent and achieves nitrification, while increasing the space requirement to a relatively small extent.

The use of an aerated bed or beds allows the aerobic digester to be used at little extra cost and the plastic media will give a high specific surface for the volume as compared with conventional arrangements. This enables a very high organic and hydraulic loading rate to be achieved, the aeration of the liquid in the packed column(s) increasing the oxygen transfer efficiency when compared to a normal aeration tank. The provision of the plastic media submerged within the sludge ensures a thorough distribution. While no recirculation should be necessary, the various recirculation paths have been provided should it become necessary in a particular circumstance.

It will be appreciated that the apparatus of the invention can be extremely compact and yet have a high organic and hydraulic loading as has been indicated above.

I claim:

1. A method of treating whole raw sewage effluent including the steps of macerating the whole raw sewage effluent, passing it to a vessel containing submerged contact media comprising a bed of randomly arranged discrete pieces of plastics material, passing the effluent through the media, passing air through the effluent and media and withdrawing treated effluent from the vessel at a point above the bed.

2. A method as claimed in claim 1 including the further step of passing the effluent from the vessel to a settlement tank.

3. A method as claimed in claim 2 including the further step of passing the treated effluent from said settlement tank to a second vessel containing submerged contact media and passing air through the effluent and media in the second vessel.

4. A method as claimed in claim 3 including the further step of passing the effluent from the second vessel to a second settlement tank.

5. A method as claimed in claim 1, wherein the air is fed upwardly through the or each vessel.

6. A method as claimed in claim 1, wherein the effluent is fed upwardly through the or each vessel.

7. Whole raw sewage effluent treatment apparatus, comprising a macerator, at least one vessel, contact media comprising a bed of randomly arranged discrete pieces of plastics material within said vessel, means to supply effluent to said vessel, means for supplying air to said vessel, whereby said effluent and air pass through said bed, and means to withdraw treated effluent from said vessel at a location in said vessel above said media, such that the media is submerged.

8. Apparatus as claimed in claim 7 and further comprising a settlement tank connected to said vessel to receive treated effluent therefrom.

9. Apparatus as claimed in claim 8 and further comprising a second vessel containing contact media and connected to said settlement tank, and a second settlement tank to receive treated effluent from said second vessel.

10. Apparatus as claimed in claim 7, wherein said media comprises short lengths of tubing.

11. Apparatus as claimed in claim 7, and further comprising upper and lower media retaining grids in said at least one vessel.

12. Apparatus as claimed in claim 11 wherein said effluent supply means and said air supply means are located to supply effluent and air respectively to said at least one vessel at a location below said lower grid.

13. Apparatus as claimed in claim 11 and further comprising an intermediate grid in one said vessel, said intermediate grid defining with said upper and lower grids two compartments.

14. Apparatus as claimed in claim 13 wherein media of 2 inches diameter are in one of said compartments and media of between 3 and 4 inches diameter are in the other of said compartments.

15. Apparatus as claimed in claim 9 wherein the media in said second vessel are of 1 inch diameter.

16. Apparatus as claimed in claim 7, and further comprising a diffuser in said at least one vessel for supplying air.

17. Apparatus as claimed in claim 7, and further comprising an effluent recirculation pipe to said at least one vessel to recirculate effluent through said vessel.

* * * * *